(12) United States Patent
Hara et al.

(10) Patent No.: US 12,162,298 B2
(45) Date of Patent: Dec. 10, 2024

(54) MANUFACTURING METHOD OF PRINTED MATERIAL

(71) Applicant: Toshiba Tec Kabushiki Kaisha, Tokyo (JP)

(72) Inventors: Takafumi Hara, Sunto Shizuoka (JP); Maiko Miyoshi, Izunokuni Shizuoka (JP); Mamoru Nomura, Yokosuka Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/157,715

(22) Filed: Jan. 20, 2023

(65) Prior Publication Data

US 2023/0373228 A1 Nov. 23, 2023

(30) Foreign Application Priority Data

May 18, 2022 (JP) .................. 2022-081719

(51) Int. Cl.
*B41J 3/51* (2006.01)
*C09D 11/40* (2014.01)
*G06K 19/08* (2006.01)

(52) U.S. Cl.
CPC .............. *B41J 3/51* (2013.01); *C09D 11/40* (2013.01); *G06K 19/08* (2013.01)

(58) Field of Classification Search
CPC .............. B41J 3/51; C09D 11/40; G06K 19/08
USPC ..................................... 235/1 R, 494
See application file for complete search history.

(56) References Cited

U.S. PATENT DOCUMENTS

2012/0256000 A1* 10/2012 Cok ................ G06K 19/06056
235/462.41

FOREIGN PATENT DOCUMENTS

| EP | 0730977 A1 * | 3/1996 | ............ B41M 5/38 |
| JP | 2002037420 A | 2/2002 | |
| JP | 2003-203210 A | 7/2003 | |
| WO | WO-2021175445 A1 * | 9/2021 | ............ G01K 3/04 |

* cited by examiner

*Primary Examiner* — Toan C Ly
(74) *Attorney, Agent, or Firm* — Kim & Stewart LLP

(57) ABSTRACT

A manufacturing method of a printed material that stores machine-readable information, includes forming, on a base material, a first layer including a first code symbol that is machine-readable and represents first information, using a first coloring material, and forming, on the first layer, a second layer including a second code symbol that is machine-readable and represents second information, using a second coloring material that is different from the first coloring material and decolorable at a particular temperature, such that the first code symbol is at least partly covered by the second coloring material.

22 Claims, 9 Drawing Sheets

MANUFACTURING METHOD OF PRINTED MATERIAL

CROSS-REFERENCE TO RELATED APPLICATION(S)

This application is based upon and claims the benefit of priority from Japanese Patent Application No. 2022-081719, filed May 18, 2022, the entire contents of which are incorporated herein by reference.

FIELD

Embodiments described herein relate generally to a manufacturing method of a printed material, a printing system for manufacturing a printed material, and a machine-readable label.

BACKGROUND

Conventionally, when two different QR codes (registered trademark) are printed on one printed material, the two QR codes need to be arranged at a fixed distance. This is to prevent a code reader from recognizing the two QR codes at the same time.

For example, when two QR codes having the same size are printed on one printed material, the two QR codes need to be separated by a distance that is equal to or greater than the size of the QR code. As a result, the area required for arranging the two QR codes in the printed material becomes greater.

SUMMARY OF THE INVENTION

Embodiments of the present invention provide a technique capable of efficiently arranging a plurality of code symbols.

In one embodiment, a manufacturing method of a printed material that stores machine-readable information, includes forming, on a base material, a first layer including a first code symbol that is machine-readable and represents first information, using a first coloring material, and forming, on the first layer, a second layer including a second code symbol that is machine-readable and represents second information, using a second coloring material that is different from the first coloring material and decolorable at a particular temperature, such that the first code symbol is at least partly covered by the second coloring material.

DETAILED DESCRIPTION

Hereinafter, embodiments will be described with reference to the drawings.

A first example of a printed material P according to an embodiment will be described.

Figure 1:
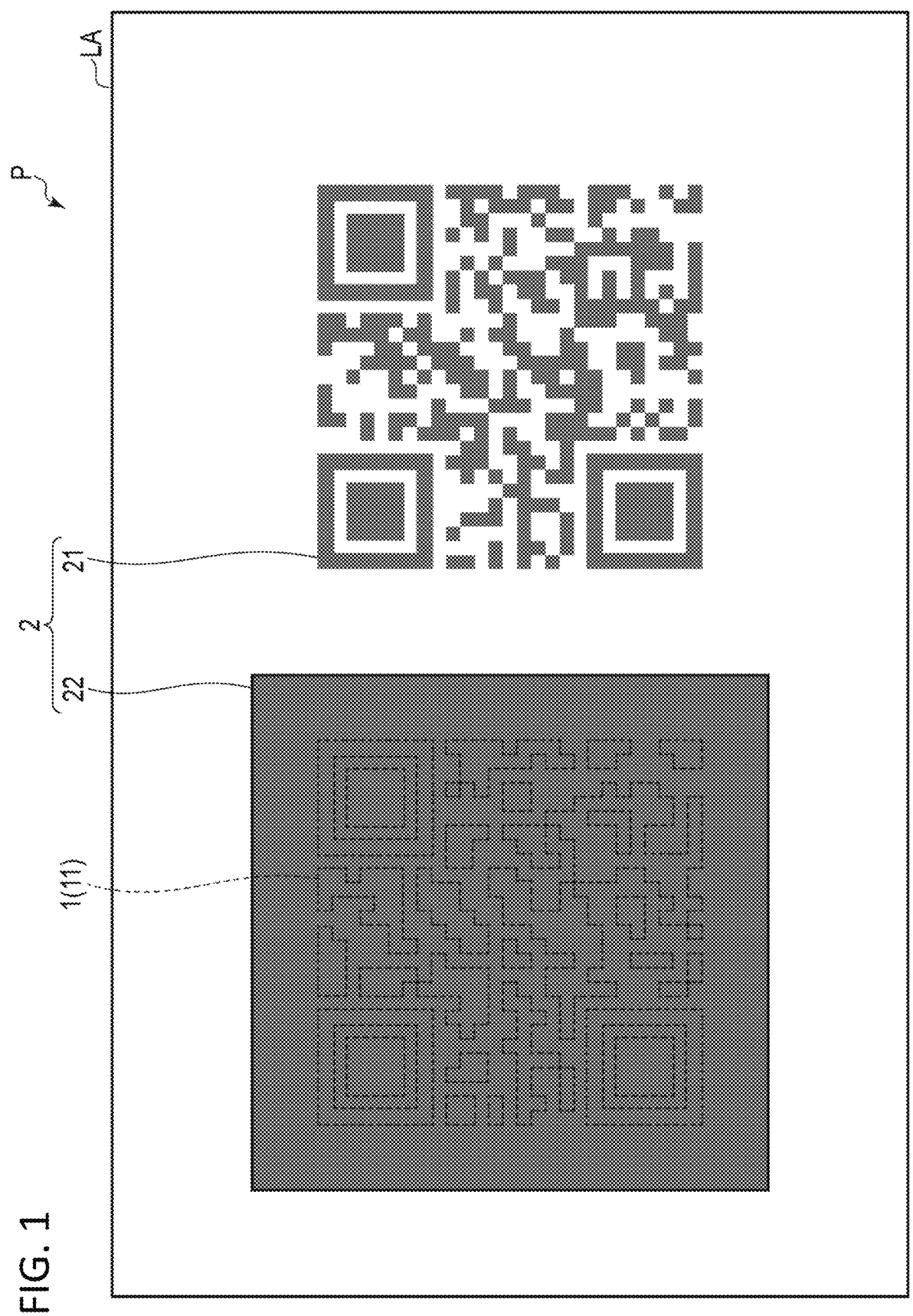
FIG. 1 is a plan view illustrating a first example of a printed material according to an embodiment.

FIG. 1 is a plan view showing the first example of the printed material P. The printed material P comprises a label LA, a first printed layer 1 and a second printed layer 2.

The label LA is a medium having a printable surface. The label LA is a printable base material. The base material is not limited to a sheet-like label LA made of paper or the like. The base material may be a bag such as a paper bag or a box such as cardboard.

The first printed layer 1 is a printed layer formed on the label LA by a first coloring material. On the label LA means on the face of the label LA. For example, the first coloring material is a non-decolorable ink that is not decolored at any temperature.

The first printed layer 1 comprises a first code symbol 11. The first code symbol 11 is an image directly formed on the label LA by the first coloring material. The first code symbol 11 is a code symbol that represents first information that can be acquired by a code reader. For example, the first code symbol 11 is a two-dimensional code symbol. Here, a QR code symbol composed of dark-colored cells and light-colored cells will be described as an example of the first code symbol 11. Dark-colored cells are formed on the label LA by the first coloring material. Light-colored cells are not formed on the label LA by the first coloring material. The code reader is an electronic device that includes a camera or the like that reads code symbols and can acquire information represented by the code symbols. The electronic device may be a device such as a smartphone having a function of acquiring information represented by a code symbol.

The second printed layer 2 is a printed layer formed on the label LA so as to partly or entirely cover the first code symbol 11 with a second coloring material. When the second printed layer 2 is in the colored state, the second printed layer 2 partly or entirely covers the first code symbol 11 in such a manner that the first information represented by the first code symbol 11 cannot be acquired by the code reader. An aspect in which the first information is not obtainable by the code reader includes that the first code symbol 11 cannot be read by the code reader. The second coloring material is a thermochromic coloring material that is decolored at a predetermined temperature. For example, the second coloring material is a decolorable ink at a predetermined temperature. In FIG. 1, for convenience of explanation, a portion of the first code symbol 11 covered with the second printed layer 2 is indicated by broken lines. The portion of the first code symbol 11 covered by the second printed layer 2 is not visible at all depending on the density of the second printed layer 2.

The second printed layer 2 includes a second code symbol 21. The second code symbol 21 is an image formed on the label LA by the second coloring material. The second code symbol 21 is a code symbol that represents second information that can be acquired by the code reader. For example, the second code symbol 21 is a two-dimensional code symbol. Here, a QR code symbol composed of dark-colored cells and light-colored cells will be described as an example of the second code symbol 21. The dark-colored cells are areas formed on the label LA by the second coloring material. The light-colored cells are areas that are not formed on the label LA by the second coloring material. The second information is different from the first information.

In the first example, the second code symbol 21 does not cover the first code symbol 11 and is therefore formed directly on the label LA. The size of the second code symbol 21 may be the same as the size of the first code symbol 11, or may be different from the size of the first code symbol 11. The second code symbol 21 is formed on the label LA away from the first code symbol 11 so as not to overlap the first code symbol 11. The distance between the first code symbol 11 and the second code symbol 21 is greater than the distance of 0 cm. When the first code symbol 11 and the second code symbol 21 have the same size, the distance between the first code symbol 11 and the second code symbol 21 may be a distance less than the length of one side of the second code symbol 21.

The second printed layer 2 comprises an image 22. The image 22 is different from the second code symbol 21. The image 22 is formed on the label LA so as to partly or entirely cover the first code symbol 11 by the second coloring material. A part of the image 22 covering the first code symbol 11 with the second coloring material is formed on the first code symbol 11. A part of the image 22 that does not cover the first code symbol 11 with the second coloring material is formed directly on the label LA.

In the first example, the image 22 is located outside an outer edge of the second code symbol 21 so as not to overlap with the second code symbol 21. When the image 22 is in the colored state (i.e., is not decolored), the image 22 partly or entirely covers the first code symbol 11 in such a manner that the first information represented by the first code symbol 11 cannot be acquired by the code reader. The image 22 may be a solid image formed of the second coloring material on the entire inner side of the outer edge of the image 22. The image 22 may include an area that is not formed of the second coloring material at a portion of the inner side of the outer edge of the image 22. In this example, the image 22 is an image such as a pattern or a picture.

When the image 22 entirely covers the first code symbol 11, the size of the image 22 may be the same as that of the first code symbol 11 or may be larger than that of the first code symbol 11. The image 22 may cover a portion of the first code symbol 11 as follows. The image 22 may cover at least one of three finder patterns included in the first code symbol 11. The finder pattern is used for position recognition of the first code symbol 11 by the code reader. The image 22 may cover at least a part of the area in which the first information included in the first code symbol 11 is recorded. When the image 22 covers a part of the first code symbol 11, the size of the image 22 may be smaller than the first code symbol 11 or may be equal to or larger than the first code symbol 11. The image 22 may be composed of a plurality of images.

In the example illustrated in FIG. 1, the image 22 is a solid-coated image in which the entire inner side of the outer edge of the image 22 is formed of the second coloring material. The size of the image 22 is larger than the first code symbol 11. The image 22 entirely covers the first code symbol 11.

A case where the second printed layer 2 is in the colored state in the printed material P of the first example will be described. Since the image 22 is colored, the first code symbol 11 is partly or entirely covered and invisible. Since the code reader cannot read the first code symbol 11, it cannot acquire the first information represented by the first code symbol 11. On the other hand, the second code symbol 21 is colored. Since the code reader can read the second code symbol 21, the second information represented by the second code symbol 21 can be obtained.

Figure 2:
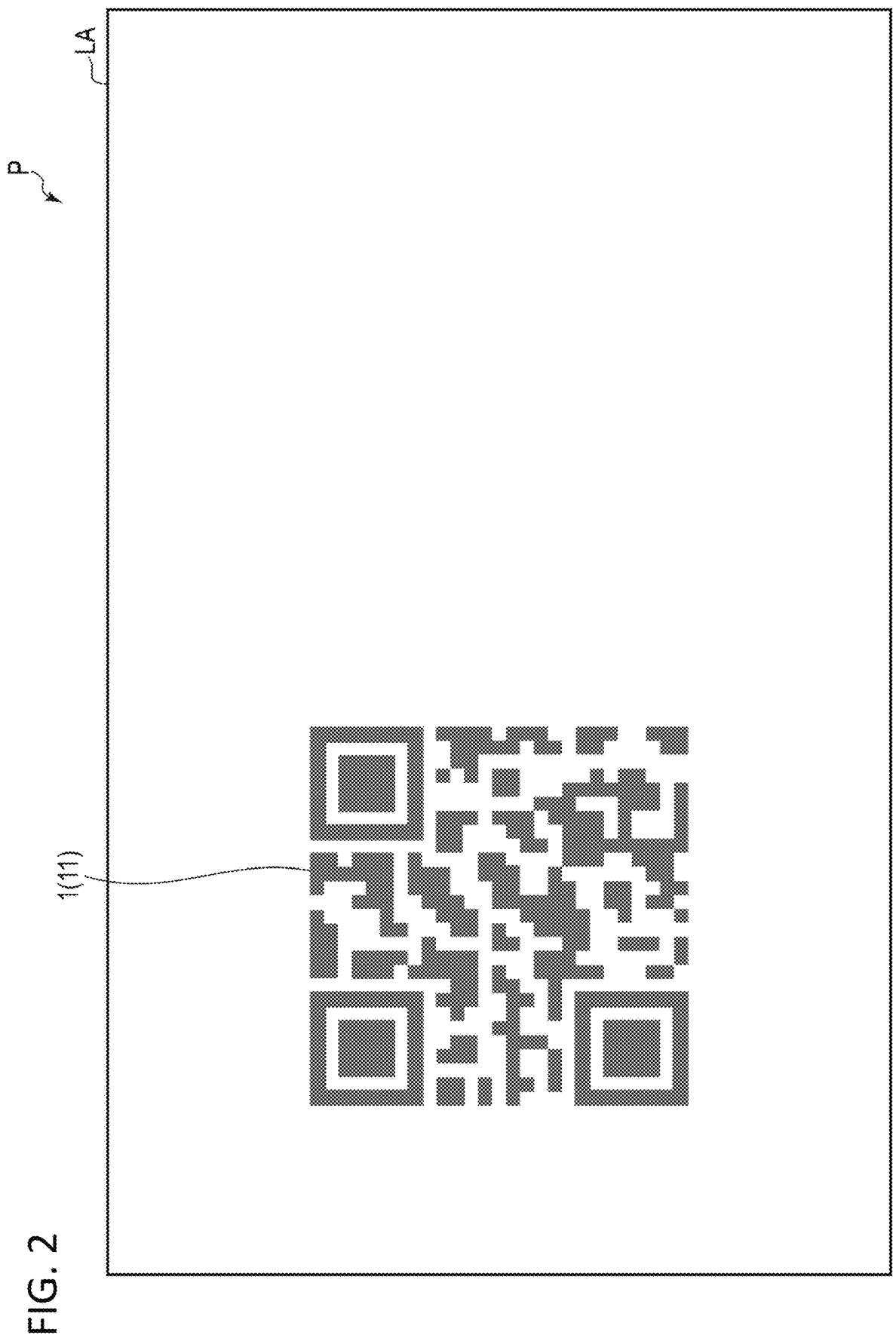
FIG. 2 is a plan view illustrating a case where a second printed layer is in a decolored state in the first example of the printed material.

FIG. 2 is a plan view showing a case where the second printed layer 2 is in a decolored state in the first example of the printed material P.

The state of the second printed layer 2 changes from the colored state to the decolored state in an environment in which a temperature of the printed material P becomes equal to or higher than a predetermined temperature. The state of the second printed layer 2 changes from the colored state to the decolored state when the printed material P is heated by the heater to reach the predetermined temperature or higher.

Since the second coloring material is decolored at the predetermined temperature or higher, the second code symbol 21 and the image 22 are decolored at that temperature. Since the code reader cannot read the second code symbol 21, it cannot acquire the second information represented by the second code symbol 21. On the other hand, when the image 22 changes from the colored state to the decolored state, the first code symbol 11 appears as illustrated in FIG. 2. Since the first coloring material is not decolored even at the predetermined temperature or higher, the first code symbol 11 is colored and visible at that temperature. Since the code reader can read the first code symbol 11, the code reader can obtain the first information represented by the first code symbol 11.

The state of the second printed layer 2 is changed from the decolored state to the colored state by cooling. Since the state of the second printed layer 2 reversibly changes between the colored state and the decolored state depending on the temperature, the printed material P can be reused.

According to the first example, the printed material P can be configured such that any one of the two code symbols can be read by the code reader by using the first coloring material and the second coloring material. For example, the printed material P may be affixed to a container, and the environment in which the container is placed may be inspected according to which of the two code symbols can be read by the code reader at the time of delivery. For example, the printed material P may be heated at a predetermined temperature or higher by a heater when necessary, so that the second code symbol 21 can be read by the code reader. Thus, the printed material P can prevent the code reader from recognizing two code symbols at the same time.

According to the first example, the printed material P can be arranged such that the first code symbol 11 and the second code symbol 21 are arranged close to each other. As a result, the printed material P can aggregate the two code symbols in a narrow range, and thus can efficiently arrange the two code symbols. Since the label LA is small, the loss of the label LA can be reduced.

According to the first example, the printed material P can arrange two code symbols in the same size. This allows the code reader to easily read each of the two code symbols.

A second example of the printed material according to the embodiment will be described.

Figure 3:
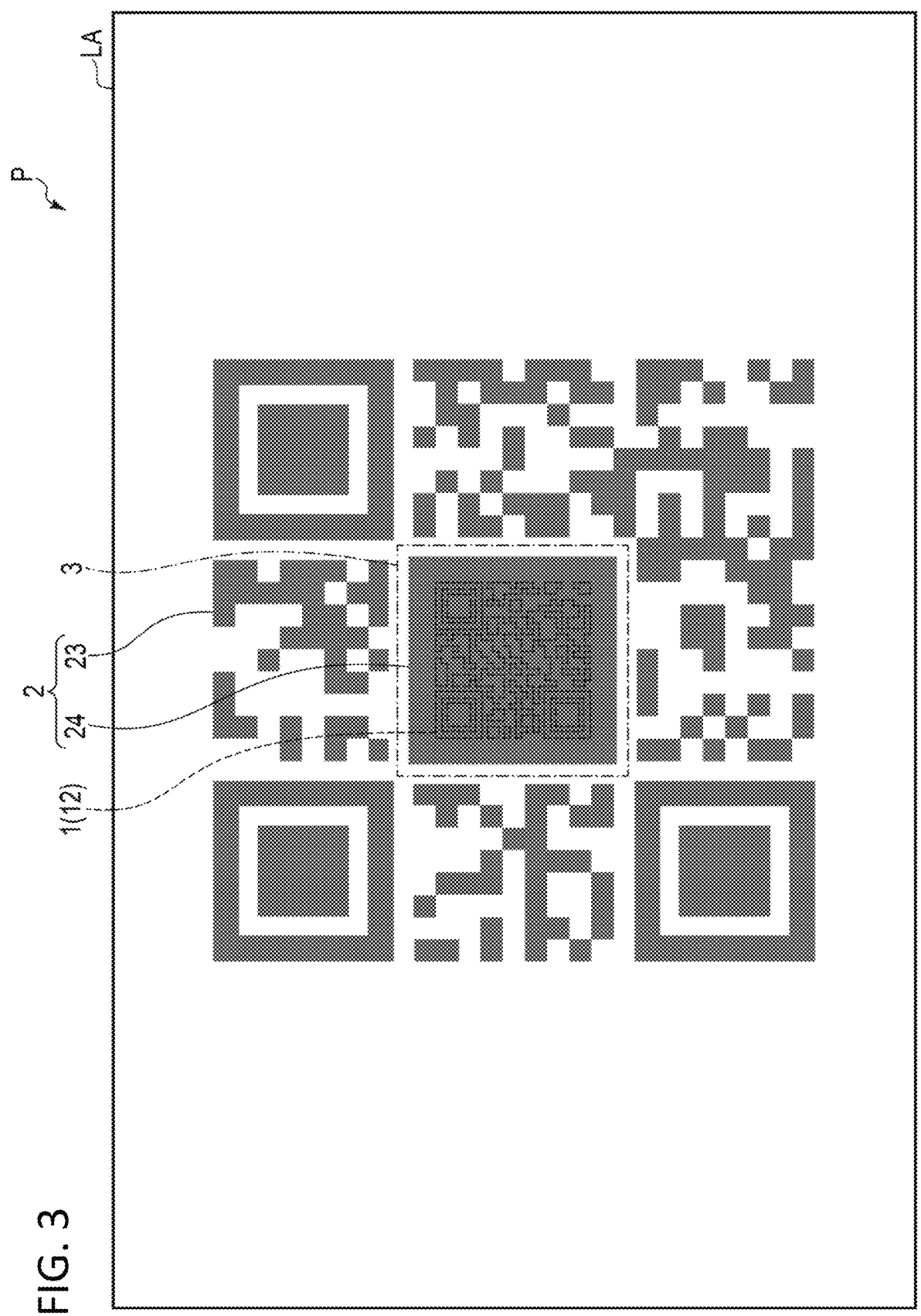
FIG. 3 is a plan view illustrating a second example of the printed material.

FIG. 3 is a plan view illustrating the second example of the printed material P. The second example is different from the first example in that a second code symbol 23 includes a free area 3. The second example is different from the first example in that an image 24 different from the second code symbol 23 is located inside the outer edge of the second code symbol 23.

The printed material P comprises a label LA, a first printed layer 1 and a second printed layer 2.

The label LA is, as in the first example, a medium having a printable surface. The first printed layer 1 is, as in the first example, a printed layer formed on the label LA by the first coloring material. The first printed layer 1 comprises a first code symbol 12. The first code symbol 12 is an image directly formed on the label LA by the first coloring material in the same manner as the first code symbol 11 of the first example. The first code symbol 12 is a code symbol that represents first information that can be acquired by a code reader. For example, the first code symbol 12 is a two-dimensional code symbol. Here, a QR code symbol will be described as an example of the first code symbol 12.

As in the first example, the second printed layer 2 is a printed layer formed on the label LA so as to partly or entirely cover the first code symbol 12 by the second coloring material. When the second printed layer 2 is in the colored state, the second printed layer 2 partly or entirely covers the first code symbol 12 in such a manner that the first information represented by the first code symbol 12 cannot be acquired by the code reader. In FIG. 3, for convenience of explanation, a portion of the first code symbol 12 covered with the second printed layer 2 is indicated by broken lines. The portion of the first code symbol 12 covered by the second printed layer 2 is not visible at all depending on the density of the second printed layer 2.

The second printed layer 2 includes the second code symbol 23. The second code symbol 23 is an image formed on the label LA by the second coloring material in the same manner as the second code symbol 21 of the first example. The second code symbol 23 is a code symbol that represents second information that can be acquired by the code reader. For example, the second code symbol 23 is a two-dimensional code symbol. A QR code symbol composed of dark-colored cells and light-colored cells will be described as an example of the second code symbol 23.

In the second example, the second code symbol 23 includes the free area 3, unlike the second code symbol 21 of the first example. The free area 3 is an area formed inside the second code symbol 23 but does not store the second information. The free area 3 is an area that does not affect the second code symbol 23. The second code symbol 23 is an image formed on the label LA by the second coloring material so as to include the first code symbol 12 in the free area 3. Since the second code symbol 23 does not cover the first code symbol 12, it is an image directly formed on the label LA. The size of the second code symbol 23 is larger than that of the first code symbol 12. The size of the first code symbol 12 is smaller than the same or free area 3 as the free area 3.

The second printed layer 2 comprises the image 24 in the free area 3. The image 24 is an image different from the second code symbol 23. The image 24 is an image formed on the label LA so as to partly or entirely cover the first code symbol 12 by the second coloring material, similarly to the image 22 of the first example. A portion of the image 24 covering the first code symbol 12 with the second coloring material is formed on the first code symbol 12. A part of the images 24 that does not cover the first code symbol 12 with the second coloring material is formed directly on the label LA.

In the second example, the image 24 is located in the free area 3 so as not to overlap with the second code symbol 23. When the image 24 is in the colored state, the image 24 partly or entirely covers the first code symbol 12 in such a manner that the first information represented by the first code symbol 12 cannot be acquired by the code reader. The image 24 may be a solid image formed of the second coloring material on the entire inner side of the outer edge of the image 24. The image 24 may be an image including an area that is not formed by the second coloring material at a portion of the inner side of the outer edge of the image 24. In this example, the image 24 is an image such as a pattern or a picture.

If the image 24 entirely covers the first code symbol 12, the size of the image 24 may be the same as the first code symbol 12, or it may be larger than the first code symbol 12. The image 24 may cover a portion of the first code symbol 12 as follows. The image 24 may cover at least one of the three finder patterns included in the first code symbol 12. The image 24 may cover at least a part of the area in which the first information included in the first code symbol 12 is recorded. When the image 24 covers a part of the first code symbol 12, the size of the image 24 may be smaller than the first code symbol 12 or may be equal to or larger than the first code symbol 12. The image 24 may be composed of a plurality of images.

In the example illustrated in FIG. 3, the size of the first code symbol 12 is smaller than that of the free area 3. The size of the image 24 is smaller than that of the free area 3. The image 24 is a solid-painted image in which the entire inner side of the outer edge of the image 24 is formed of the second coloring material. The size of the image 24 is larger than the first code symbol 12. The image 24 entirely covers the first code symbol 12 in this example.

A case where the second printed layer 2 is in the colored state in the printed material P of the second example will be described. Since the image 24 is colored in the free area 3, the first code symbol 12 in the free area 3 is partly or entirely invisible. Since the code reader cannot read the first code symbol 12, it cannot obtain the first information represented by the first code symbol 12. On the other hand, the second code symbol 23 is colored. Since the code reader can read the second code symbol 23, the second information represented by the second code symbol 23 can be obtained.

Figure 4:
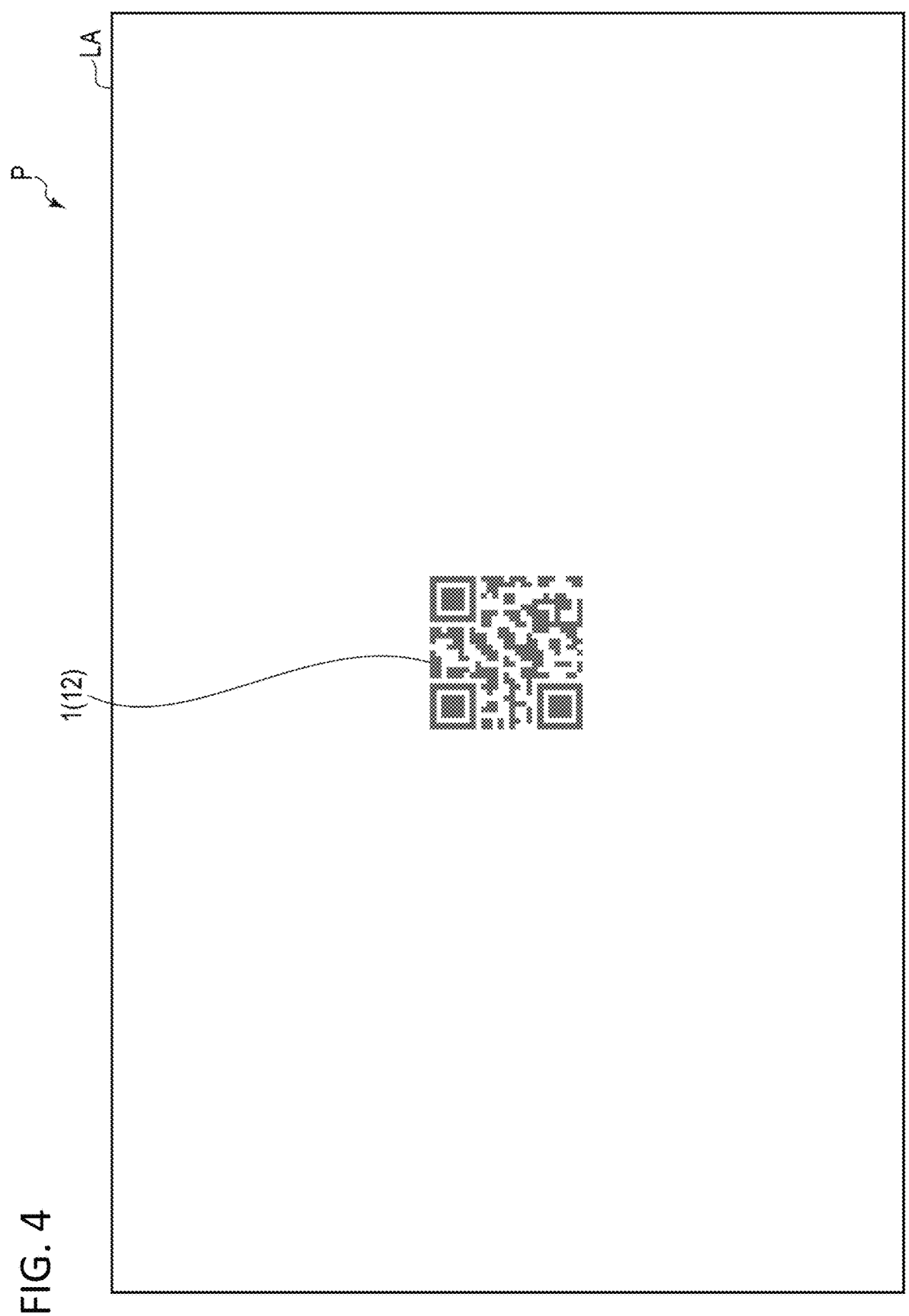
FIG. 4 is a plan view of a second example of the printed material in which the second printed layer is in a decolored state.

FIG. 4 is a plan view of the second printed layer 2 in the decolored state in the second example of the printed material P.

Since the second coloring material is decolored at a predetermined temperature or higher, the second code symbol 23 and the image 24 are decolored. Since the code reader cannot read the second code symbol 23, it cannot acquire the second information represented by the second code symbol 23. On the other hand, when the image 24 changes from the colored state to the decolored state, the first code symbol 12 appears as illustrated in FIG. 4. Since the first coloring material is not decolored even at the predetermined temperature or higher, the first code symbol 12 is colored. Since the code reader can read the first code symbol 12, it can obtain the first information represented by the first code symbol 12.

According to the second example, in the same manner as in the first example, the printed material P can be configured such that any one of the two code symbols can be read by the code reader using the first color material and the second color material.

According to the second example, the printed material P can include the first code symbol 12 inside the outer edge of the second code symbol 23. As a result, the two code symbols can be aggregated in a narrow range, and thus the size of the label LA can be reduced.

According to the second example, the printed material P can include the first code symbol 12 in the free area 3 of the second code symbol 23. Thus, the first code symbol 13 can be arranged inside the outer edge of the second code symbol 25 with a size corresponding to the free area 3.

A third example of the printed material P will be described.

Figure 5:
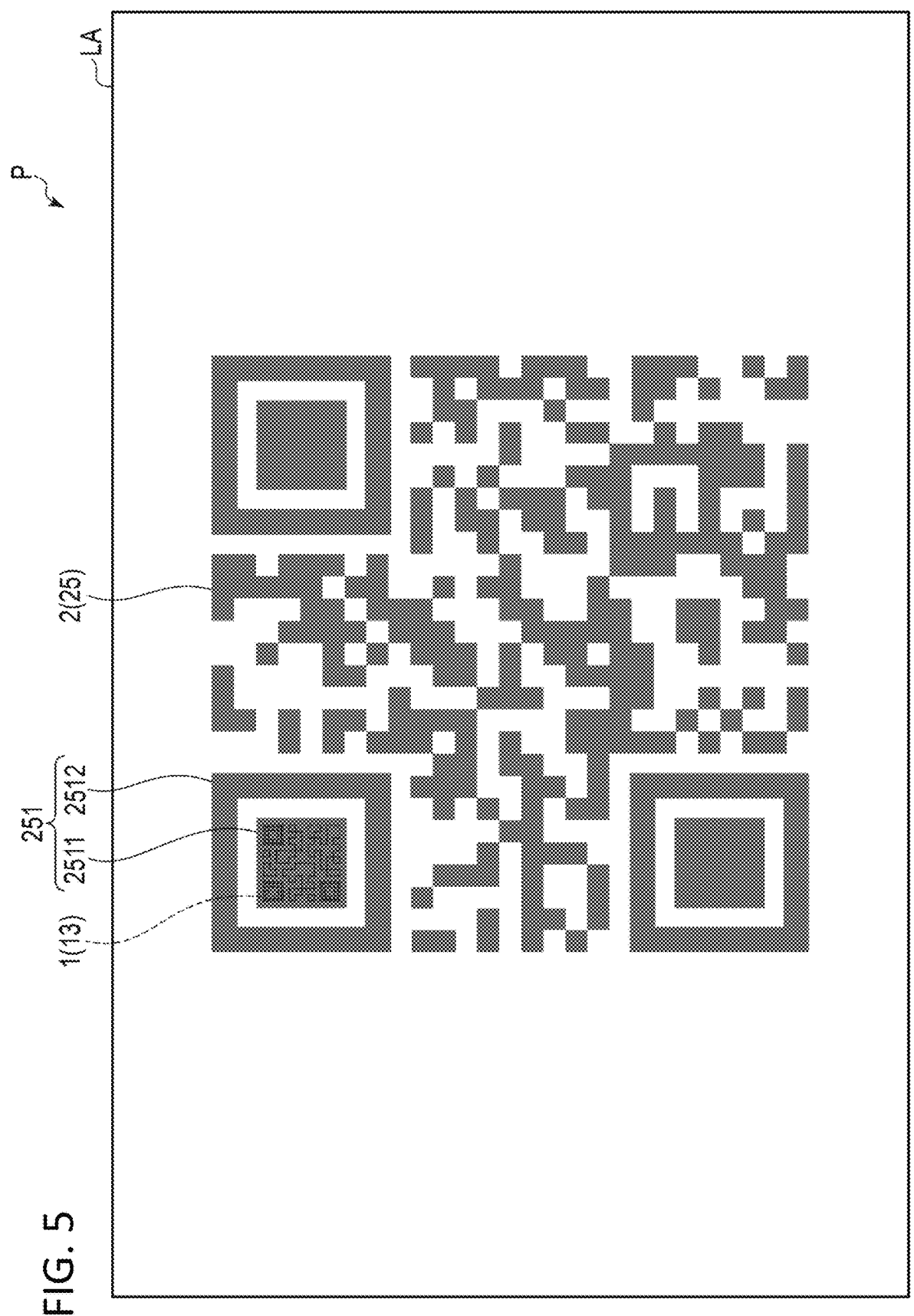
FIG. 5 is a plan view illustrating a third example of the printed material.

FIG. 5 is a plan view illustrating the third example of the printed material P. The third example differs from the first example or the second example in that the second printed layer 2 does not contain an image different from a second code symbol 25.

The printed material P comprises a label LA, a first printed layer 1 and a second printed layer 2.

The label LA is, as in the first example, a medium having a printable surface.

The first printed layer 1 is, as in the first example, a printed layer formed on the label LA by the first coloring material. The first printed layer 1 comprises a first code symbol 13. The first code symbol 13 is directly formed on the label LA by the first coloring material, similar to the first code symbol 11 of the first example. The first code symbol 13 is a code symbol that represents first information that can be acquired by a code reader. For example, the first code symbol 13 is a two-dimensional code symbol. Here, a QR code symbol will be described as an example of the first code symbol 13.

As in the first example, the second printed layer 2 is formed on the label LA so as to partly or entirely cover the first code symbol 13 by the second coloring material. When the second printed layer 2 is in the colored state, the second printed layer 2 partly or entirely covers the first code symbol 13 in such a manner that the first information represented by the first code symbol 13 cannot be acquired by the code reader. In FIG. 5, for convenience of explanation, a portion of the first code symbol 13 covered with the second printed layer 2 is indicated by broken lines. The portion of the first code symbol 13 covered by the second printed layer 2 is not visible at all depending on the density of the second printed layer 2.

The second printed layer 2 comprises a second code symbol 25. The second code symbol 25 is formed on the label LA by the second coloring material in the same manner as the second code symbol 21 of the first example. The second code symbol 25 is a code symbol that represents second information that can be acquired by the code reader. For example, the second code symbol 25 is a two-dimensional code symbol. Here, a QR code symbol will be described as an example of the second code symbol 25. The second code symbol 25 includes a finder pattern 251. The finder pattern 251 includes a first dark area 2511 composed of dark-colored cells and a second dark area 2512 composed of dark-colored cells. The first dark area 2511 is a rectangular area. The first dark area 2511 is an area formed of the second coloring material in the entirety inside the outer edge of the first dark area 2511. The second dark area 2512 is an area surrounding the first dark area 2511.

The second code symbol 25 is formed on the label LA so as to partly or entirely cover the first code symbol 13 by the second coloring material. The size of the second code symbol 25 is larger than that of the first code symbol 13. When the second code symbol 25 is in the colored state, the second code symbol 25 partly or entirely covers the first code symbol 13 in such a manner that the first information represented by the first code symbol 13 cannot be acquired by the code reader. A portion of the second code symbol 25 covering the first code symbol 13 with the second coloring material is formed on the first code symbol 13. A part of the second code symbol 25 that does not cover the first code symbol 13 with the second coloring material is formed directly on the label LA.

The finder pattern 251 of the second code symbol 25 partly or entirely covers the first code symbol 13. For example, the first dark area 2511 of the finder pattern 251 partly or entirely covers the first code symbol 13. In the example illustrated in FIG. 5, the size of the first dark area 2511 is the same as that of the first code symbol 13. The first dark area 2511 entirely covers the first code symbol 13 in this example.

When the first dark area 2511 entirely covers the first code symbol 13, the size of the first dark area 2511 may be the same as the size of the first code symbol 13 or may be larger than that of the first code symbol 13. The first dark area 2511 may cover a portion of the first code symbol 11 as follows. The first dark area 2511 may cover at least one of the three finder patterns included in the first code symbol 13. The first dark area 2511 may cover at least a part of the symbol that represents the first information.

A case where the second printed layer 2 is in the colored state in the printed material P of the third example will be described. Since the second code symbol 25 is colored, the first code symbol 13 is partly or entirely invisible. Since the code reader cannot read the first code symbol 13, it cannot acquire the first information represented by the first code symbol 13. On the other hand, since the code reader can read the second code symbol 25, the second information represented by the second code symbol 25 can be obtained.

Figure 6:
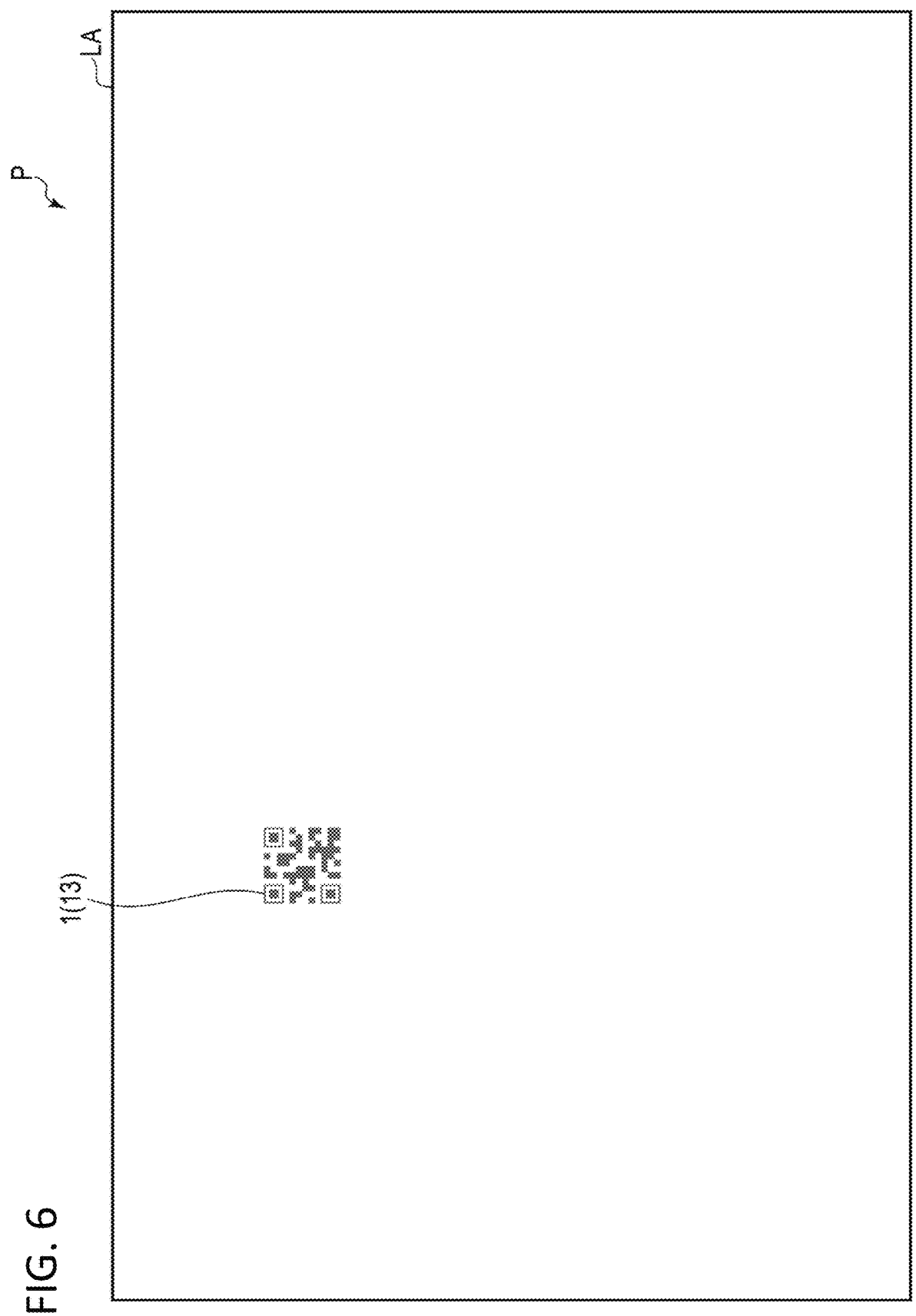
FIG. 6 is a plan view of a case where the second printed layer is in a decolored state in the third example of the printed material.

FIG. 6 is a plan view showing a case where the second printed layer 2 is in the decolored state in the third example of the printed material P.

Since the second coloring material is decolored at a predetermined temperature or higher, the second code symbol 25 is decolored. Since the code reader cannot read the second code symbol 25, it cannot obtain the second information represented by the second code symbol 25. On the other hand, when the second code symbol 25 changes from the colored state to the decolored state, the first code symbol 13 appears as illustrated in FIG. 6. Since the first coloring material is not decolored even at the predetermined temperature or higher, the first code symbol 13 is colored. Since the code reader can read the first code symbol 13, the first information represented by the first code symbol 13 can be obtained.

According to the third example, in the same manner as in the first example, the printed material P can be configured such that any one of the two code symbols can be read by the code reader using the first color material and the second color material.

According to the third example, the first code symbol 13 can be inside the outer edge of the second code symbol 25 as in the second example.

According to the third example, the first code symbol 13 can be at a position on the printed material P so as to overlap with the finder pattern 251 of the second code symbol 25. Accordingly, the first code symbol 13 can be inside the outer edge of the second code symbol 25 without reducing the amount of information of the first information represented by the second code symbol 25. Further, since the printed material P does not require an image different from the second code symbol 25 in order to cover the first code symbol 13, the amount of use of the second coloring material can be reduced.

An example of a printing system 10 according to an embodiment will be described.

Figure 7:
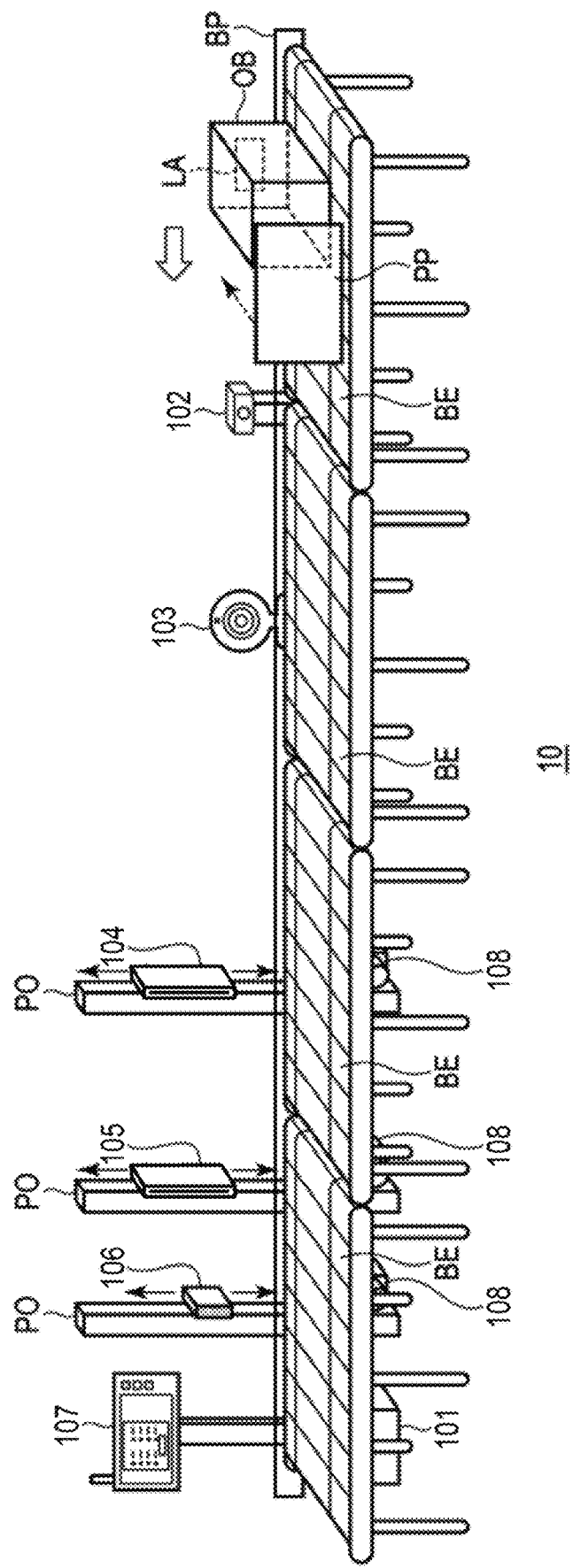
FIG. 7 is a perspective view for explaining a configuration of a printing system according to an embodiment.

FIG. 7 is a perspective view for explaining a configuration example of the printing system 10.

The printing system 10 includes a conveyance belt BE on which a print object OB is placed. For example, the conveyance belt BE moves at a constant speed, and conveys the placed print object OB to a plurality of process positions for writing print information as indicated by a white arrow in FIG. 7. As a result, the print information is printed onto the print object OB. The print information includes first image data for forming a first print layer on the print object OB by the first color material and second image data for forming a second print layer on the print object OB by the second color material. The plurality of processes includes a first printing process of forming the first printed layer with the first coloring material, a second printing process of forming the second printed layer with the second coloring material, a reading process of reading the printed information, and the like. As described above, the conveyance belt BE constitutes a conveyance machine that conveys the print object OB. Although four conveyance belt BE are shown in FIG. 7, one conveyance belt may cover the entire process position, or a plurality of conveyance belts other than four may cover the entire process position.

The print object OB has a rectangular parallelepiped shape such as a corrugated board or a returnable box, and a label LA of a color that differs from the print object OB such as white is attached to its printing surface. Print information is printed on this label LA. In other words, the label LA corresponds to the print area, and the surface to which the label LA is attached corresponds to the printing surface. For example, the print object OB in which an article is stored is picked up by an operator or an appropriate pick-up mechanism, and the printing surface is placed on the conveyance belt BE in a direction perpendicular to the lateral side of the conveyance belt BE, that is, the conveyance direction of the print object OB.

In addition, the printing device 10 may directly print on one side surface of the print object OB without the label LA. The print object OB is an example of a base material. In this case, the print area is not the entire side surface of the print object OB but the area where a certain margin is taken from the edge area. This is because a rectangular parallelepiped-shaped print object OB is generally more likely to be damaged in its edge area, which may render the printed information illegible.

Further, the printing system 10 may use both the print object OB to which the label LA is attached and the print object OB without the label LA in a mixed manner.

The printing system 10 further includes a controller 101, a timing sensor 102, an object sensor 103, a first printer 104, a second printer 105, a code reader 106, a user interface 107, and three motors 108. The timing sensor 102, the object sensor 103, the first printer 104 disposed at the first printing process position, the second printer 105 disposed at the second printing process position, the code reader 106 disposed at the reading process position, and the user interface 107 are arranged in this order along the conveying belt BE. In other words, the first printing process position, the second printing process position, and the reading process position are arranged in this order.

The controller 101 controls the operation of each component of the printing system 10.

The timing sensor 102 is constituted by, for example, a photoelectric sensor, and detects that the print object OB has reached the position of the timing sensor 102. The controller 101 can control the operation timings of the object sensor 103, the first printer 104, the second printer 105, and the code reader 106 based on the moving velocity of the print object OB by the conveyance belt BE with reference to the time when the timing sensor 102 detects the arrival of the print object OB.

The object sensor 103 is, for example, an image sensor such as a camera, and captures an image of the print object OB. The controller 101 can detect the presence or absence of the label LA on the print object OB and the size of the print object OB from the captured image of the print object OB by a well-known image process. That is, the controller 101 detects a distance from the front end portion of the printing surface of the print object OB to the label LA in the conveyance direction, a distance from the upper end portion of the printing surface (a distance from the upper surface) to the label LA, and the vertical and horizontal dimensions of the label LA. When the label LA is not attached, the controller 101 detects the vertical and horizontal dimensions of the print object OB. Then, the controller 101 can determine the size and the position of the print area for printing the print information on the basis of the detected label LA or the size of the print object OB and the known information. As described above, the controller 101 controls the object sensor 103 to detect the size and position of the print area on the conveyed print object OB.

The first printer 104 is an inkjet printer using the first coloring material. The first printer 104 is supported by a support PO to be movable in the height direction by a motor 108 as indicated by solid arrows in FIG. 7. The first printer 104 is supported by the support PO so that the first print layers can be formed in the print area from the direction perpendicular to the conveyance direction of the print object OB. The controller 101 may control the motor 108 based on the size and position of the print area determined using the object sensor 103 to adjust the height position of the first printer 104 to match the print area. In addition, the controller 101 operates the first printer 104 at a timing when the print area passes, which is calculated based on the time detected by the timing sensor 102, so that the first printed layers can be formed on the print object OB using the first coloring material. As described above, the controller 101 controls the first printer 104 to form the first printed layer on the print object OB from a direction perpendicular to the conveyance direction according to the timing at which the print area passes.

The second printer 105 is an inkjet printer using the second coloring material. The second printers 105 are supported by the support PO to be movable in the height direction by the motor 108 as indicated by the solid arrows in FIG. 7. The second printer 105 is supported by the support PO so that the second print layer can be formed in the print area from the direction perpendicular to the conveyance direction of the print object OB. The controller 101 may control the motor 108 based on the size and position of the print area determined using the object sensor 103 to adjust the height position of the second printer 105 to match the print area. In addition, the controller 101 operates the second printer 105 at a timing when the print area passes, which is calculated based on the time detected by the timing sensor 102, so that the second printed layer can be formed on the print object OB using the second coloring material. As described above, the controller 101 controls the second printer 105, which is disposed at a stage subsequent to the first printer 104 along the conveyance direction, to form the second printed layer on the print object OB from a direction perpendicular to the conveyance direction according to the timing at which the print area passes.

The code reader 106 is supported by the support PO to be movable in the height direction by the motor 108 as indicated by the solid arrows in FIG. 7. The code reader 106 is supported by the support PO so that the second code symbol printed on the label LA can be read from the direction perpendicular to the conveyance direction of the print object OB, that is, from the side surface side thereof. The controller 101 may control the motor 108 based on the size and position of the print area determined using the object sensor 103 to adjust the height position of the code reader 106 to match the printed position of the second code symbol. Further, the controller 101 can read the second code symbol printed and acquire the second information by operating the code reader 106 at a timing when the print area passes, which is calculated based on the time detected by the timing sensor 102.

The user interface 107 includes a system monitor for displaying various types of information from the controller 101. The user interface 107 may include keys and buttons for inputting various instructions to the controller 101. The user interface 107 may include a touch panel on which touch keys are arranged on a monitor screen such as a liquid crystal display.

In the first printing process, the second printing process, and the reading process, in order to achieve an accurate operation, the print area needs to face the first printer 104, the second printer 105, and the code reader 106.

Therefore, the printing system 10 of the present embodiment includes an abutting plate BP and a pressing plate PP with the conveyance belt BE interposed between both sides thereof. The abutting plate BP extends along the conveyance belt BE. The pressing plate PP moves toward the abutting plate BP as indicated by the dashed-dotted arrow in FIG. 7. During this moving operation, the print object OB is brought into contact with and pressed toward the abutting plate BP, so that the printing surface of the print object OB abuts against the abutting plate BP. Thus, the printing surface of the print object OB is aligned with the conveyance direction and is conveyed in this state. The abutting surface of the abutting plate BP that abuts the print object OB is formed of a low-friction material so as not to affect the conveyance of the print object OB. When the printing surface of the print object OB comes into contact with the abutting plate BP, the pressing plate PP is retracted to the starting position. Whether or not the printing surface of the print object OB has hit the abutting plate BP can be detected as, for example, a change in repulsive force, or can be determined from images captured by a camera.

Note that the operation timing of the pressing plate PP is, for example, a timing corresponding to the operation instruction of the operator when the operator places the print object OB on the conveyance belt BE. When the print object OB is placed by the pick-up mechanism, the controller 101 can also perform timing control based on the placing operation of the pick-up mechanism.

In the example of FIG. 7, the abutting plate BP is a single plate, but may be constituted by a plurality of consecutive plates. The abutting plate BP may be arranged at least from the arrangement position of the pressing plate PP to the second printed material process position.

Figure 8:
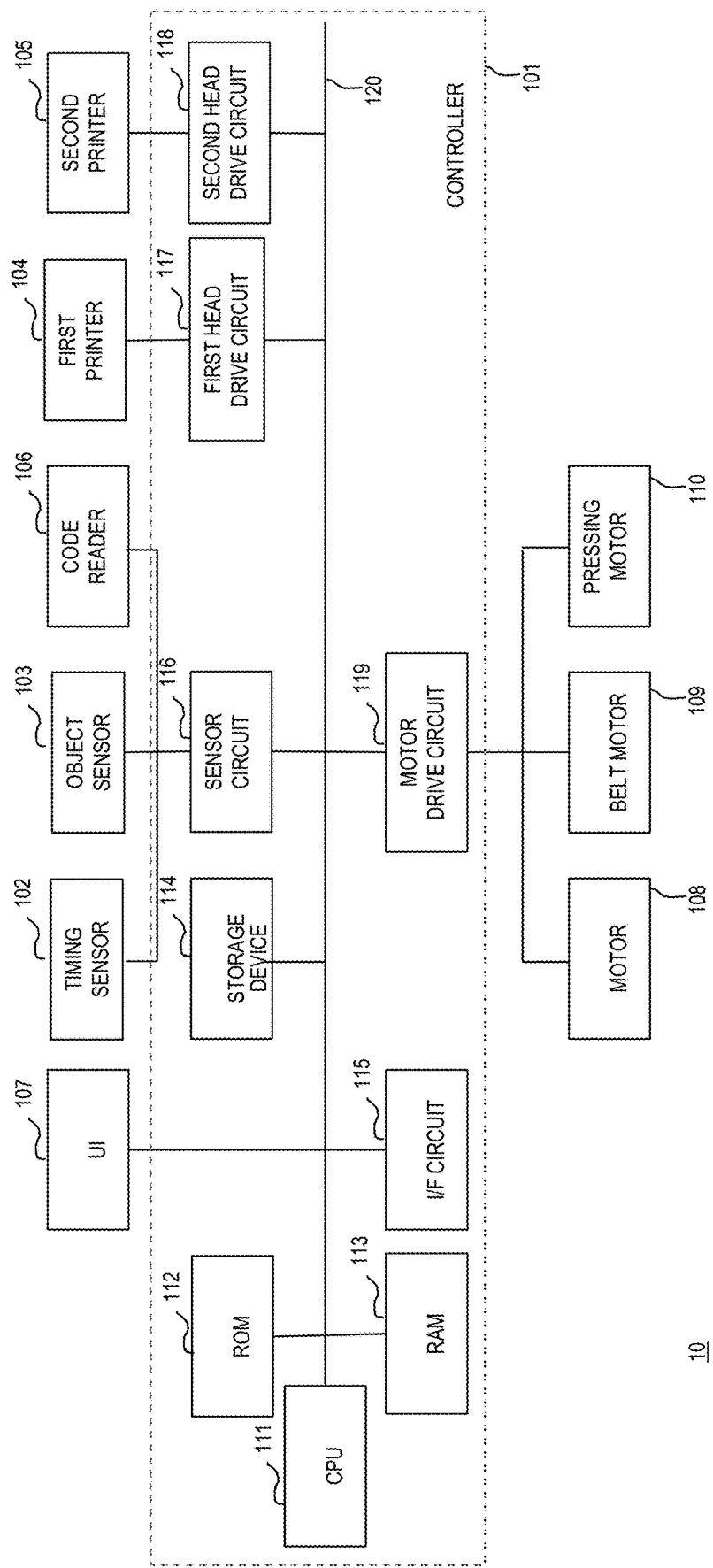
FIG. 8 is a hardware block diagram of the printing system.

FIG. 8 is a hardware block diagram of the printing system 10. The controller 101 includes a CPU (central processing unit) 111, a ROM (read only memory) 112, a RAM (random access memory) 113, a storage device 114, an interface (I/F) circuit 115, a sensor circuit 116, a first head drive circuit 117, a second head drive circuit 118, and a motor drive circuit 119, which are connected to the CPU 111 via a bus 120.

The CPU 111 is a processor for controlling the operation of the entire printing system 10. The CPU 111 performs various functions by executing programs stored in advance in the ROM 112. The CPU 111 has multi cores or supports multi-threading so as to execute a plurality of pieces of information processing at the same time. Note that some of the various functions performed by the CPU 111 may be performed by hardware circuits such as ASIC (Application Specific Integrated Circuit), FPGA (Field-Programmable Gate Array), and GPU (Graphics Processing Unit). The CPU 111 then controls the functions performed by the hardware circuits.

The ROM 112 is a non-volatile memory in which control programs, control data, and the like are stored in advance.

The RAM 113 is a volatile memory. The RAM 113 temporarily stores data and the like that are being processed by the CPU 111. The RAM 113 may store data required to execute the program, an execution result of the program, and the like. For example, the RAM 113 temporarily stores, as the print information, the first image data for forming the first print layer on the print object OB by the first color material. The RAM 113 temporarily stores the second image data forming the second printed layer on the print object OB by the second coloring material.

The storage device 114 is a secondary storage device such as an EEPROM (Electric Erasable Programmable Read-Only Memory), an HDD (Hard Disc Drive), an SSD (Solid State Drive), etc. The storage device 114 stores data used by the CPU 111 to perform various types of processing and data generated by processing in the CPU 111 in a nonvolatile manner. For example, the storage device 114 stores the first information to be represented by the first barcode symbol and the second information to be represented by the second barcode symbol. For example, the storage device 114 stores the content of the first information acquired from the second bar code symbol by the code reader 106 as object information in association with a unique object ID. The object ID is arbitrarily assigned by the CPU 111, and is referred to herein as a serial number.

The interface circuit 115 transmits and receives data to and from an external device via a network such as a LAN (local area network). The interface circuit 115 may be an interface circuit for reading and writing data from and to a removable memory medium such as a USB (universal serious bus) memory or a memory card.

The sensor circuit 116 is connected to the timing sensor 102, the object sensor 103, and the code reader 106 to receive and transmit signals or data from them to the CPU 111.

The first head drive circuit 117 drives the first printer 104 based on the first image data temporarily stored in the RAM 113 under the control of the CPU 111.

The second head drive circuit 118 drives the second printer 105 based on the second image data temporarily stored in the RAM 113 under the control of the CPU 111.

The motor drive circuit 119 controls driving of the motor 108, a belt motor 109, and a pressing motor 110 in accordance with a signal from the CPU 111. The motor drive circuit 119 can independently control the motor 108 for the first printer 104, the motor 108 for the second printer 105, and the motor 108 for the code reader 106. The belt motor 109 is a motor for driving the conveyance belt BE. Only one belt motor 109 is shown as a representative, and a plurality of belt motors may be provided. The pressing motor 110 is a motor that moves the plate PP.

The user interface (UI) 107 is also connected to the bus 120 and can be controlled by the CPU 111.

Operation Example

Figure 9:
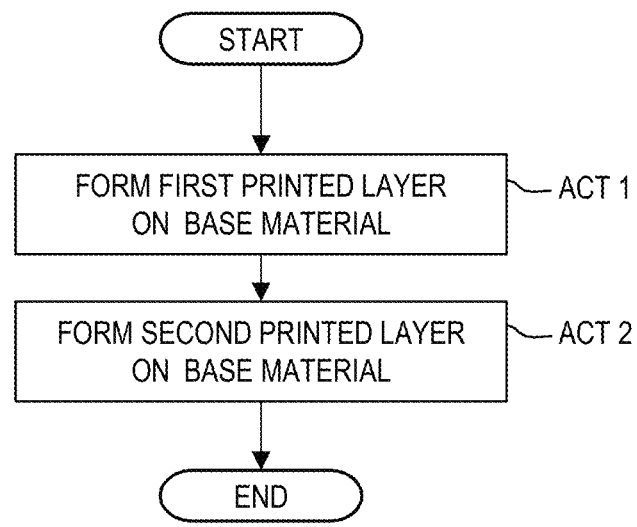
FIG. 9 is a flowchart of a print manufacturing process performed by the printing system.

FIG. 9 is a flowchart of a manufacturing process of the printed material P by the printing system 10.

The manufacturing process of the printed material P includes the first printing process of forming the first printed layer 1 by the first coloring material and the second printing process of forming the second printed layer 2 by the second coloring material.

The CPU 111 controls the first head drive circuit 117 and the first printer 104 to form the first printed layer 1 on the base material (ACT 1). In ACT 1, for example, the first head drive circuit 117 drives the first printer 104 based on the first image data that is input by the CPU 111. The first printer 104 forms the first printed layer 1 including the first code symbol on the label LA or the print object OB by using the first coloring material.

The CPU 111 controls the second head drive circuit 118 and the second printer 105 to form the second printed layer 2 on the base material (ACT 2). In ACT 2, for example, the head drive circuit 118 drives the second printer 105 based on the second image data that is input by the CPU 111. The second printer 105 forms the second printed layer 2 including the second code symbol on the label LA or the print object OB using the second coloring material.

The printing system 10 can produce the printed material P by the production process of the printed material P in the manner of any one of the first to third examples described above.

In the above-described examples, the printed material P comprises a base material. The printed material P comprises a first printed layer 1 formed on the base material by a first coloring material having a non-decolorable property at any temperature and comprising a first code symbol representing first information. The printed material P includes the second printed layer 2 formed on the base material so as to partly or entirely cover the first code symbol by a second coloring material that is decolorable at a predetermined temperature, and including the second code symbol representing second information.

Since the second print layer covers the first code symbol on the printed material P, it is not necessary to arrange the first code symbol and the second code symbol at a large distance. That is, the first code symbol and the second code symbol can be arranged within a narrow range. Further, the printed material P can be configured such that either of the two code symbols can be read by the code reader by using the first color material and the second color material. Therefore, the printed material P can prevent the code reader from recognizing two code symbols at the same time.

In an embodiment, the second print layer 2 of the printed material P includes an image different from the second code symbol. The image partly or entirely covers the first code symbol. Since the first code symbol is covered by the image different from the second code symbol, the first code symbol and the second code symbol can be arranged close to each other.

In an embodiment, the image partly or entirely covering the first code symbol is located outside the outer edge of the second code symbol. In this way, the first code symbol and the second code symbol having the same size are arranged on the printed material P. Therefore, the code reader can easily read either the first code symbol or the second code symbol.

In an embodiment, the second code symbol includes a free area not including any information. The second printed layer 2 includes an image partly or entirely covering the first code symbols in the free area. As a result, the first code symbol having a size corresponding to the free area can be placed inside the outer edge of the second code symbol.

In an embodiment, the second code symbol includes a finder pattern. The finder pattern partly or entirely covers the first code symbol. Thus, the first code symbol can be printed at a position overlapping with the finder pattern of the second code symbol. Accordingly, the first code symbol can be placed inside the outer edge of the second code symbol without reducing the amount of information of the first information represented by the second code symbol. Further, since the printed material P does not require a different image than the second code symbol to cover the first code symbol, the amount of use of the second coloring material can be reduced.

In an embodiment, a method of manufacturing the printed material P includes forming the first printed layer 1 on a base material, the first printed layer including the first code symbol representing first information, with a first coloring material having a property of not being decolored at any temperature. The method of manufacturing the printed material further includes forming the second printed layer 2 including the second code symbol representing the second information so as to partly or entirely cover the first code symbol by the second coloring material that is decolorable at a predetermined temperature.

In the method of manufacturing the printed material P, since the second printed layer is formed on the base material so as to cover the first code symbol, it is not necessary to dispose the first code symbol and the second code symbol at a large distance. In the method of manufacturing the printed material P, since the first code symbol and the second code symbol can be aggregated in a narrow range, a plurality of code symbols can be efficiently arranged.

In the above embodiments, the first coloring material and the second coloring material are inks, but embodiments of the present invention are not limited thereto. The first coloring material and the second coloring material may be toner.

In the above embodiments, the first code symbol and the second code symbol are two-dimensional code symbols, but embodiments of the present invention are not limited thereto. The first code symbol and the second code symbol may be one-dimensional barcode symbols or any other symbols that can be read by a code reader.

In the above-described embodiments, the printing system 10 forms the first printed layer 1 and the second printed layer 2 on the label LA attached to the printing object OB, but embodiments of the present invention are not limited thereto. The printing system 10 may form the first printed layer 1 and the second printed layer 2 on a label that is not affixed to any object.

One or more programs used in the above-described embodiments may be stored in the ROM 112 or the storage device 114 when the printing system 10 is shipped or may be installed thereafter. In the latter case, the programs may be downloaded via a network or may be copied from a non-transitory computer readable recording medium. The recording medium may be any form as long as it can store the programs such as a CD-ROM or a memory card and can be read by a computer.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A manufacturing method for a printed material that stores machine-readable information, the method comprising:
    forming, on a base material, a first layer including a first code symbol that is machine-readable and represents first information, using first ink or toner; and
    forming, on the first layer, a second layer including a second code symbol that is machine-readable and represents second information, using second ink or toner that is different from the first ink or toner and decolorable at a particular temperature, such that the first code symbol is covered by the second ink or toner.
2. The manufacturing method according to claim 1, wherein forming the second layer includes forming an image over the first code symbol using the second ink or toner.
3. The manufacturing method according to claim 2, wherein the image partly covers the first code symbol.
4. The manufacturing method according to claim 2, wherein the image entirely covers the first code symbol.
5. The manufacturing method according to claim 2, wherein
    the second code symbol has a rectangular shape, and
    the image is formed outside of an outer edge of the second code symbol.
6. The manufacturing method according to claim 1, wherein
    the second code symbol includes a free area in which the second information is not stored, and
    the free area is formed on the first code symbol.
7. The manufacturing method according to claim 6, wherein the free area partly covers the first code symbol.
8. The manufacturing method according to claim 6, wherein the free area entirely covers the first code symbol.
9. The manufacturing method according to claim 1, wherein the second code symbol includes a finder pattern that is formed on the first code symbol.
10. The manufacturing method according to claim 1, wherein the first code symbol is independently decodable to obtain the first information without the second code symbol.
11. The manufacturing method according to claim 1, wherein all of the first code symbol is covered by a portion of the second ink or toner.
12. The manufacturing method according to claim 1, wherein no portion of the second code symbol covers the first code symbol.
13. A printing system for manufacturing a printed material that stores machine-readable information, comprising:
    a first printer configured to print a first code symbol that is machine-readable and represents first information using first ink or toner;
    a second printer configured to print a second code symbol that is machine-readable and represents second information using second ink or toner that is different from the first ink or toner and decolorable at a particular temperature; and
    a processor configured to:
        control the first printer to form, on a base material, a first layer including the first code symbol, and
        control the second printer to form, on the first layer, a second layer including the second code symbol such that the first code symbol is covered by the second ink or toner.
14. The printing system according to claim 13, wherein the processor is configured to control the second printer to form an image on the first code symbol using the second ink or toner.
15. The printing system according to claim 14, wherein the image partly covers the first code symbol.
16. The printing system according to claim 14, wherein the image entirely covers the first code symbol.
17. The printing system according to claim 14, wherein
    the second code symbol has a rectangular shape, and
    the image is formed outside of an outer edge of the second code symbol.
18. The printing system according to claim 13, wherein
    the second code symbol includes a free area in which the second information is not stored, and
    the free area is formed on the first code symbol.
19. The printing system according to claim 18, wherein the free area partly covers the first code symbol.
20. The printing system according to claim 18, wherein the free area entirely covers the first code symbol.
21. The printing system according to claim 13, wherein the second code symbol includes a finder pattern that is formed on the first code symbol.
22. A machine-readable label that stores two different pieces of information that cannot be read at the same time, comprising:
    a base material;
    a first layer on the base material and including a first code symbol that is machine-readable and represents first information, the first layer being formed of first ink or toner; and
    a second layer on the first layer and including a second code symbol that is machine-readable and represents second information, the second layer being formed of second ink or toner that is different from the first ink or toner and decolorable at a particular temperature, wherein
    the first code symbol is covered by the second ink or toner such that a code reader cannot read the first code symbol until the second code symbol is decolored.

* * * * *